Aug. 21, 1956   A. G. CLUNE   2,759,396
LIGHT REFLECTOR SIGNAL DEVICE
Filed March 24, 1953
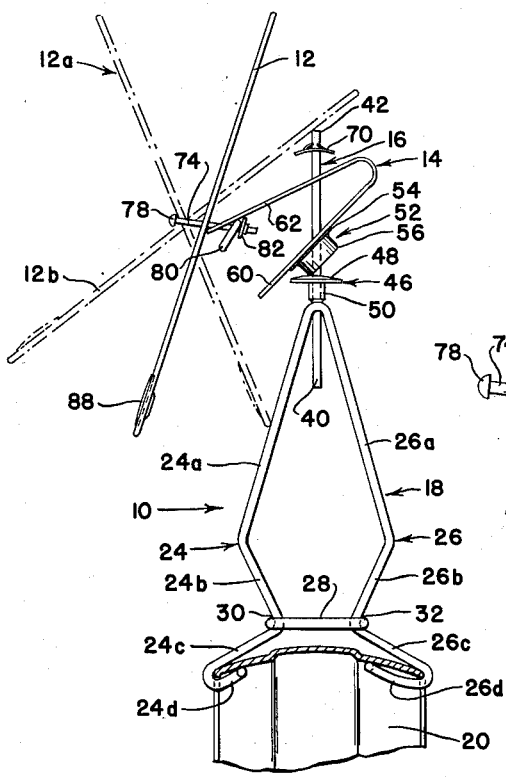
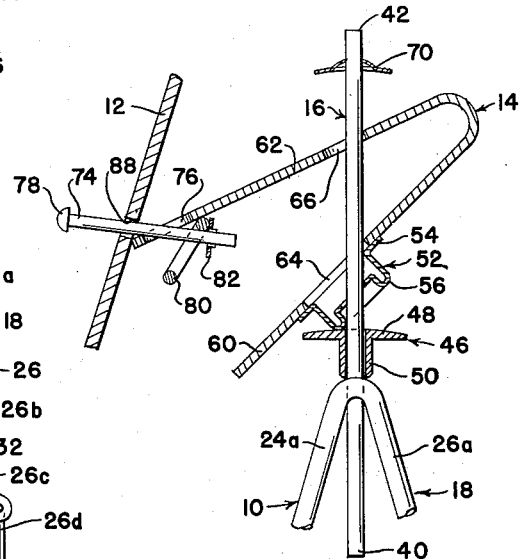
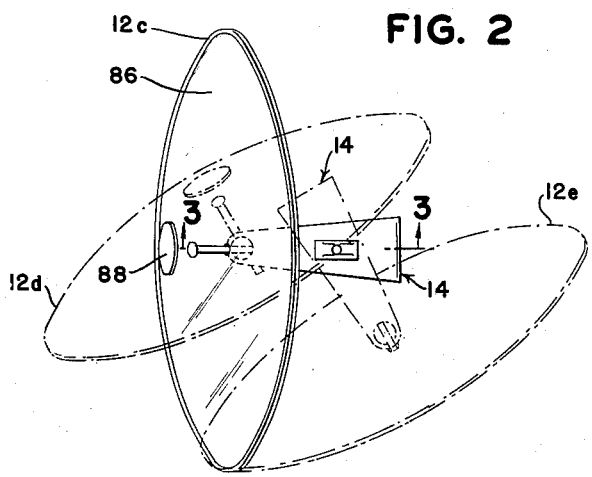
INVENTOR
Andrew G. Clune
BY
ATTORNEYS

United States Patent Office 2,759,396
Patented Aug. 21, 1956

2,759,396

LIGHT REFLECTOR SIGNAL DEVICE

Andrew G. Clune, New York, N. Y.

Application March 24, 1953, Serial No. 344,296

7 Claims. (Cl. 88—81)

This invention relates to light reflector signal devices and has for its object improvements in such devices that are useful particularly for bicycles.

Accidents to bicycle riders, serious and fatal, particularly to children, when struck by an automobile are increasing in number from year to year. This trend is of grave concern to parents and others concerned with highway accidents. A particularly dangerous time for children bicycle riders is at dusk, or early in the evening, just before they return, or while they are returning, home. The children tend to be tired, hurried and careless. In addition an operator of an automobile at that time of day is beset especially with difficulties. On first turning on his headlights, it is not easy for him promptly to focus his eyes sharply on hazards on or to the side of the road. Bicycles are for the most part unlighted; they frequently have no signal light reflectors; or at best they have inadequate reflectors. Such conditions are conducive to accidents which happen only too often to the sorrow of all concerned.

Although numerous attempts have been made to provide simple light reflectors for bicycles, those currently in use for the most part are woefully inadequate. They usually consist of small stationary or fixed reflectors secured to the rear mud guard of the bicycle. In a short time the reflectors are covered with dirt, so that their original insufficient light reflecting efficiency is soon reduced or lost.

My investigations have led to the discovery of improvements in light reflector signals that are simple devices and highly effective, that are attractive, child-appealing and that will function so efficiently as to attract quickly the attention of the operator of an oncoming automobile.

These and other features of the invention will better be understood by referring to the accompanying drawings, taken in conjunction with the following description, in which:

Fig. 1 is an end elevation of a light reflector signal device, shown mounted on a mud guard of a bicycle, illustrative of a practice of the invention;

Fig. 2 is a perspective view of the light reflector itself and its immediate support, shown in a plurality of planes; and Fig. 3 is a fragmentary sectional view of the upper portion of the device.

Referring first to Fig. 1, a light reflector signal device 10 includes a movable base plate 12 mounted on a swivel bracket 14, pivotally mounted on an upright rod 16, the lower portion of which is secured to a holder in the form of a spring clamp 18 secured to a bicycle mud guard 20.

The clamp includes a pair of juxtaposed elongated wire members 24 and 26 in zigzag relationship to each other, advantageously formed from a single piece of wire bent into the shape shown. The zigzag relationship results in each of the wire members being divided into a plurality of relatively short arms. Thus, member 24 is divided into angular sections: upper end arm 24a, intermediate arm 24b, upper mud guard arm 24c and lower mud guard arm 24d; while member 26 is divided into complementary arms 26a, 26b, 26c and 26d. This angularity tends to strengthen the arms, and hence adds to the overall strength of the clamp.

It will be noted that the two lower mud guard arms are of unequal length, 26d being substantially longer than 24d. This seeming unbalance facilitates placement of the clamp on the mud guard. The two lower arms are pointed outwardly and oppositely from each other at pronounced angles. This arrangement not only facilitates placement of the clamp, but gives the arms a much stronger gripping action, on the mud guard.

An adjustable holder 28, in the form of a retainer hook, fits around and in angular bends or crooks 30 and 32 formed by arms 24b—24c and 26b—26c, respectively. The adjustable holder has zigzag arms, having a closed eye at one end fitting around crook 30 in wire member 24, and a hook at the other end fitting, or adapted to be fitted, around crook 32 in wire member 26. The hook is spaced from and is about parallel to one of the zigzag arms to facilitate gripping of the two with a pair of pliers, or similar tool, when the clamp is to be attached to a mud guard; as is described in more detail in my co-pending application Serial No. 256,073, filed March 12, 1952.

The upper ends of zigzag members 24 and 26 terminate, as already indicated, in upright rod 16; the lower end 40 of which depends below and the upper end 42 of which extends above their point of juncture. A lower turntable, or rotatable washer-like member 46 is mounted on rod 16 and rests normally on the top of the clamp or juncture portion of zigzag members 24 and 26. In the instant construction the turntable is formed of a smooth-surfaced upper dome-like head 48 and a lower cylindrical body 50 which engages the top of the clamp.

Also mounted on rod 16 is an upper turntable, or rotatable washer-like member, 52; the lower portion of which is adapted to engage and move around the smooth surface of head 48 of lower turntable 46. In the instant construction turntable 52 is shown as having an upper outwardly extending flange 54 and a lower cylindrical body 56. As shown, the upper turntable is very loosely mounted on rod 16. It will be clear that turntables or rotatable members of any suitable construction may be employed, their ultimate object being to support as well as to facilitate movement of bracket 14 and base plate 12. Instead of specific turntable 52, for example, I have found it advantageous to substitute therefore one like turntable 46, mounted on rod 16 in precisely the same manner; that is to say, with its smooth-surfaced dome-like head in engagement with the swivel bracket.

As shown, swivel bracket 14 is U-shaped, being formed of a lower arm 60 and an upper arm 62. To facilitate rotation of the bracket about the rod, the lower arm is provided with a fairly large hole 64 (Fig. 3) well toward its free end and the upper arm is provided with a hole 66 well toward the end that joins the lower arm. As shown in Figs. 1 and 3, particularly, this manner of positioning the holes causes swivel bracket 14 to assume an inclined position with its free ends depending below the closed ends of its arms. It also permits the bracket to wobble during movement of the bicycle. A removable stop 70 is secured to upper end 42 of upright rod 16, well above the bracket so that the bracket may swivel freely about rod 16.

A lateral movable rod 74 extends through a fairly large hole 76 near the free end of upper arm 62 of swivel bracket 14. Its outer end terminates in a stop head 78 while its other end is fitted with a rotatable ring 80 and a removable stop 82.

Base plate 12 is provided with a hole 88 in its midportion through which extends lateral rod 74. In other words, the base plate is loosely mounted on the rod so that it is free to swivel and wobble thereon. The base plate is preferably formed of light-reflective surfaces, the outer surface more especially. To this end the surfaces may be highly polished, coated or covered in whole or in part with light-reflective material to increase their light-reflecting effectiveness.

Since the device is intended primarily for the benefit of children, to stimulate their interest in its use, it is advantageous to provide an attractive child-appealing light-reflective design particularly on the outer face 86 of the base plate. Among such designs may be configurations of cowboys, Indians, moving picture-radio-television-circus personalities, cartoons, bandits, pirates, animals, toys, etc. In such case it is desirable to suspend or counterweight the base plate so that the design normally is in an upright position. This may be accomplished by attaching a weight 88 to the outer portion of the base plate and at the bottom of the design. While the base plate may swing to and fro, gravity will tend always to bring the weight and hence the base plate back to an upright position for the design. The base plate itself preferably is circular so as not to expose corners which could be injurious to a child.

Base plate 12 and swivel bracket 14 are so joined to lateral movable rod 74 as to provide what essentially is a universal joint. As shown in Figs. 1 and 2, the base plate is free to swing and rotate in an almost endless number of planes. Three such planes 12, 12a and 12b are outlined in Fig. 1; and three other planes 12c, 12d and 12e are outlined in Fig. 2.

A variety of possible planes for the base plate is assured by lateral movable rod 74, which is free to oscillate back and forth and to tilt somewhat in hole 76 in swivel bracket 14, and by the bracket itself, which is free to swivel on upper turntable 52, the latter in turn being free to oscillate on lower turntable 46 and the lower turntable on the top of clamp 18. The bracket is free, of course, also to rise and fall on rod 16.

It will be clear, therefore, that as a child rides his bicycle over an uneven road surface, with the bicycle swaying as it necessarily must, the base plate is caused to wobble in a great multitude of planes, each one of which exerts its own light-reflective characteristic. To an observer, such as an approaching motorist, there is presented, consequently, a continuously changing animated variety of reflected light—thus calling his attention to possible danger ahead and the necessity of proceeding with extra caution. In case the base plate is provided with a light-reflective configuration, as suggested, weight 88 by gravity causes it to assume and maintain a generally upright position—to the delight particularly of children.

It will be clear to those skilled in this art that the specific device described in detail is by way of illustration only and that the practice of the invention lends itself readily to useful modifications.

I claim:

1. A light reflector signal device of the type described, comprising a holder having a lower portion formed to engage and to be secured to a part of a bicycle, a rod secured to said holder and extending upright therefrom, a swivel bracket wobbly mounted for free rotation about said upright rod, said bracket being inclined to the horizontal, and a light reflector base plate wobbly mounted on the lower portion of said swivel bracket for movement in a plurality of directions and in a plurality of planes.

2. A light reflector signal device according to claim 1, in which a turntable is mounted on the upright rod, and the bracket rests on the turntable.

3. A light reflector signal device according to claim 1, in which two superposed turntables are mounted on the upright rod, and the bracket rests on the topmost turntable.

4. A light reflector signal device according to claim 1, in which two superposed turntables are mounted on the upright rod, the bracket is generally U-shaped, the upright rod extends through holes in the arms thereof, and the bracket rests on the top turntable.

5. A light reflector signal device according to claim 1, in which the bracket is generally U-shaped with the upright rod extending through the arms, the upper arm has a rod hole near and the lower arm has a rod hole farther removed from the joinder portion of the arms for placing the bracket in an inclined position on the rod.

6. A light reflector signal device according to claim 1, in which a rod is supported by the bracket for lateral movement and the base plate is pivotally secured to said rod.

7. A light reflector signal device according to claim 1 in which the holder is a wire frame having reversely-bent portions at its lower end to engage the side edge portions of a bicycle mud guard.

References Cited in the file of this patent

UNITED STATES PATENTS

| | | |
|---|---|---|
| 516,910 | Bucherer | Mar. 20, 1894 |
| 564,454 | Ryan | July 21, 1896 |
| 669,185 | See | Mar. 5, 1901 |
| 1,359,645 | Zink | Nov. 23, 1920 |
| 1,455,441 | Hodny | May 15, 1923 |
| 2,060,483 | Bamburger | Nov. 10, 1936 |
| 2,066,641 | Melior | Jan. 4, 1937 |
| 2,561,743 | Kusnarowsis | July 24, 1951 |

FOREIGN PATENTS

| | | |
|---|---|---|
| 282,878 | Great Britain | Dec. 28, 1927 |